UNITED STATES PATENT OFFICE.

GEORGE RUDORF, OF LONDON, ENGLAND, ASSIGNOR TO THE PERMUTIT COMPANY, OF NEW YORK, N. Y., A CORPORATION OF DELAWARE.

PROCESS OF MAKING BASE-EXCHANGING BODIES.

1,304,206.    Specification of Letters Patent.    Patented May 20, 1919.

No Drawing.    Application filed December 21, 1916.    Serial No. 138,256.

*To all whom it may concern:*

Be it known that I, GEORGE RUDORF, a citizen of the British Empire, residing at London, England, have invented certain new and useful Improvements in Processes of Making Base-Exchanging Bodies, of which the following is a specification.

This invention relates to processes of making base exchanging bodies; and it comprises a method of making complex hydrated silica-containing materials useful in purifying water and for other purposes wherein a silicate and a base are co-precipitated in neutral or somewhat alkaline solution to form a gelatinous or colloid precipitate, this precipitate is then separated from the mother liquid and is dried, being best pressed somewhat prior to drying but not being washed to free it of adhering mother liquor, the drying being conducted at a comparatively low temperature until a sample of the material in contact with air at the ordinary temperature will again increase in weight or where on treating with water immediately after drying it will break up into hard angular granules of the proper size; all as more fully hereinafter set forth and as claimed.

This invention relates to the production of granular hard, angular material from gelatinous precipitates, and specifically from those of complex silicates and the like prepared by precipitation and having the power of base exchange; that is in contact with a solution having the power of giving up a base to such solution and abstracting therefrom one or more contained bases in its lieu.

In order that a base exchanging substance may be of use for purposes such as these, it is necessary that it should possess certain well defined characteristics. It must be hard, granular, the granules not too large and not too small and of a more or less uniform size, and of a pervious nature so as to give a large active surface.

While the present invention may be applied to many other gelatinous precipitates capable, upon proper treatment, of producing base exchanging substances, I shall hereinafter describe it more particularly as applied to the treatment of precipitates obtained by admixing a solution of a soluble silicate (that is a solution containing silica dissolved in, or combined with alkali) with a solution containing alumina; which latter solution may, for example, be one of aluminate of soda or aluminate of potash or a solution of sulfate of alumina. Instead of alumina solutions, solutions of compounds of very many other more or less colloid, amphoteric oxids, such as tin oxid, titanium oxid, iron oxid, etc., may be employed in connection with the silica solution. Very many of the metallic oxids when their salts are brought into contact with alkaline silicates in solution give gelatinous bodies. These gelatinous bodies carry down with them a certain amount of the alkali, soda or potash as the case may be, forming complex bodies containing silica, water, alkali and a metallic base or metallic oxid in combination. These precipitates have the power of exchanging their contained soda or potash for other bases; as for instance they may be used to soften hard water by abstracting calcium or magnesium therefrom, giving up alkali to the solution. After use they may be revivified by treatment with a solution of common salt when they once more take up sodium and the magnesium and calcium go into solution as chlorids. But while these precipitates often possess the necessary chemical properties their physical properties, since they are soft and gelatinous, render them wholly impractical in their natural state for any technical use. By whatever process they are produced they are gels.

The present invention relates to treatment of these gels for the purpose of converting them into technically useful materials, and comprises a method wherein the materials are carefully dried without washing to remove mother liquor and are thereafter treated with water to cause them to break up into granules of proper size for the present purpose. The material is not washed to remove or dilute such mother liquor as it may contain since in so washing its properties suffer more or less; and I have found that the activity is greater if the physical changes in the material resulting from drying be effected prior to the removal of the adhering mother liquor. It is not necessary that this mother liquor be present in any great amount and it is therefore often advantageous to press the precipitate prior to the drying. This gives a somewhat harder material finally. But I do not wash to any substantial degree prior to drying. Washing seems to result in the final material having a somewhat less pervious character, thereby reducing the effective area.

All these gelatinous precipitates when dried tend to produce hard, horny masses of irregular shape and size. Colloid gels are more or less porous in structure, having minute capillary pores; and when they are dry they are under internal strain. At ordinary temperatures these pores are filled with a considerable quantity of water or mother liquor as the case may be. By exposure to heat or reduced pressure, the water is driven out without in any way altering the structure, the pores now becoming filled with air. On exposure now to water, either as vapor or as liquid, the air is once more driven out of the pores and replaced by water. The rate at which this takes place will depend on (1) the extent to which the pores were emptied in the first place and (2) whether the dehydrated masses are brought into contact with liquid water or water vapor. In the latter case, the pores refill slowly and the masses remain intact. In the former case, the pores fill with such rapidity that the masses crack up into fragments, with the evolution of air bubbles and the size of the fragments is governed by the extent to which the pores had been emptied (dehydrated) previous to the refilling (hydration). Thus, if the masses be completely dried, and by this I mean the complete removal of all water which is in the pores and not chemically combined, by heating to a temperature of about 100° C., or by exposure to diminished pressure, and then immediately placed into water, they will crack up into very minute fragments resembling fine sand. In this state, they would, in general, not be suitable for use for the present purposes.

If, on the other hand, the dehydration be not carried so far, or if, after complete drying, the dried masses be left for a time in air, the subsequent hydration will result in the formation of larger fragments of a size rendering them eminently suitable for use as filtering media and, at the same time very little, if any, waste dust is produced.

At every temperature the dried, or partially dried, mass possesses a certain definite vapor tension; that is, it tends to lose water as vapor, or take it up as the case may be, until a certain definite relation, or equilibrium, is established between the water in the material and the water in the atmosphere in contact with it. If the partial pressure of the water vapor in the air is greater than the vapor tension of the material at any given temperature, the material takes up water; if it be less, then the material gives off water. The desired condition of the mass as regards water content can be attained by exposing the wet, or too much dried mass, to an atmosphere containing water vapor sufficient to give this partial pressure. Drying may therefore be performed at ordinary temperatures under reduced pressure or at ordinary pressures at a higher temperature. Or, to hasten drying still more, a combination of the two may be advantageously employed.

The dehydration under reduced pressure at ordinary temperature is a very slow procedure and not to be recommended.

In general, I have found that fragments of the most suitable size result when the drying, at ordinary atmospheric pressure, is done at about 60 to 70° C., and the hydration carried out soon after the dehydration. Under these conditions, fragments varying in size from 1 to 2 mm. are obtained and there is practically no waste dust. The actual best temperature of drying, or the best degree of dehydration depends to a certain extent on the method by which the precipitate was produced in the first place but in a general way, the temperature limits given above will be found to give the best results.

Naturally, the higher the temperature, the quicker the drying but if the temperature be much above the limits given, the dried masses should be exposed to air for a time before hydration, the time depending on the humidity of the air that is the partial pressure of water vapor in the air. Under no circumstances, however, should a temperature of 100° C. to 110° C. be much exceeded as otherwise the chemical activity of the final material may be impaired. For some reason it appears that a combination process of hydration gives better results. In this process I dry the precipitate, with or without pressing, but without removing the mother liquid by washing, to such a temperature that the pores are practically free. I then allow the material to be exposed to the air for a period so that it may take up or absorb more or less moisture from the air, and then subject it to the action of liquid water.

I have found that, in practice, it is quickest and technically most advantageous, to dry the filtered precipitates at the temperature of about 100° and when quite dry, to expose the dried masses to air for 24 hours or so before hydrating them. It must be remembered that the filtered precipitates, even when pressed with about 150 pounds pressure, still contain about 90 per cent. of their weight of water and as the greater part of this has to be removed it is clear that the higher the temperature of the drying arrangement and the better the ventilation, the more quickly will the necessary amount of water be evaporated.

In operating under this process I may first mix equivalent amounts of sodium silicate solution, which may be the ordinary syrupy waterglass of commerce diluted with some water, with a solution of sodium aluminate. The solution employed may be concentrated or diluted; in the latter case, sodium sulfate or other salts may be used to assist precipitation. It is however better to work with at least fairly strong solutions and dispense with saline coagulants.

In a specific embodiment of my process, I prepare a five per cent. solution of sodium aluminate. This may contain 50 pounds of aluminate of soda in 100 gallons. A sodium aluminate having a molecular ratio 1:1.225 contains, for this quantity 14.9 pounds $Na_2O$ and 20 pounds $Al_2O_3$. This solution may be added to 150 gallons of a sodium silicate solution containing about 128 pounds of commercial waterglass containing, say, 27.5 per cent. $SiO_2$ and 14 per cent. $Na_2O$. A jelly-like precipitate is formed which on breaking up filters and handles readily. The mother liquor after the precipitation has an alkalinity equivalent to 125 cc. N/10 acid per 100 cc. The residual alkalinity in the solution of course depends considerably upon the dilution. Good results may be obtained with solutions so dilute that in using aluminate and silicate in the ratio of, say, 9 to 12 parts of dry sodium silicate to 4 parts of dry sodium aluminate, the residual alkalinity will be about 25 cc. of N/10 acid for each 100 cc. With medium dilutions, excellent results may be obtained from mixtures with alkalinities as high as 200 cc. N/10 acid.

In making the precipitating solutions, it is best to have a ratio $Al_2O_3:SiO_2$ of 1:3 or 1:4. With these ratios, precipitation is complete, both silica and alumina precipitating. With less alumina, silica is left in solution, and with less silica alumina is left dissolved; and the precipitates, and particularly where solutions with too little silica are used, are not so easy to handle as where the above ratios are used.

However formed the precipitate is next filterpressed to form a cake. A suction filter may be used in lieu of the filterpress but I find the press more advantageous. The pressure to be used depends upon the apparatus but with a filterpress in a general way it may be said that a pressure at the beginning of 20 to 30 pounds increasing toward the end to 100 or 150 pounds gives good results. A low initial pressure gives a more uniform product when working on a large scale.

The cake formed by pressure or suction, without washing, is directly dried in any suitable form of drier at a temperature of 70° to 100° C. until a sample on exposure to the air begins to gain in weight. The cake is then removed and allowed to stand exposed to the air for about a day. It is then plunged into water. This water causes it to break up into angular fragments of about 1 to 2 mm. diameter with the production of very little finer or coarser material. This water also removes the mother liquor and acts as a washing means. The water may be hot or cold. The material may now be somewhat dried but this is not necessary; it is ready for use as it is. It may be spun in a centrifugal to remove adhering moisture and then bagged, shipped or stored, or it may be transferred directly to the water purifying apparatus. Instead of taking a solution of sodium silicate and sodium aluminate, I may use the corresponding potassium compounds. Solutions containing both potassium and sodium may be used. Or I may precipitate a solution of sodium silicate with a solution of sulfate of alumina added until the solutions are neutral to phenolphthalein. As explained in my copending application, Serial No. 138,373 filed December 22, 1916, this procedure has a number of advantages.

In lieu of using aluminate of soda or sulfate of alumina to react with silicate of soda, I may use the salts of zinc, lead, tin, etc. I regard my invention as generally applicable to all these silicate precipitates whatever the bases are which form insoluble silicates in these solutions. Material made as described may be advantageously used for softening water and for many other purposes wherein it is desired to exchange a base in solution against a base in the material; as, for example, in softening water by exchanging the lime, or lime and magnesia held dissolved in the water against alkalis, such as soda or potash, in the material; and the material after such use for exchange purposes may be revivified by a treatment with a suitable salt solution. For example, where the material has been used for softening water by abstracting lime and magnesia therefrom it may be afterward revivified with a solution of common salt. The salt solution takes up the magnesium and calcium as chlorids, and sodium is taken up by the material in their lieu, rendering such material ready for reuse. The material may also be used for all purposes where porosity is valuable. By incorporating suitable catalysts, such as nickel oxid, manganese oxids, it may be adapted for use in many other processes of treating liquids.

What I claim is:—

1. The process of making purifying materials which comprises precipitating a solution containing silica and alkali by a solution of a compound of a metal oxid, separating the major portion of the mother liquor, drying the unwashed precipitate and immersing in water to cause granulation and washing.

2. The process of making purifying materials which comprises precipitating a solution containing silica and alkali by a solution of a compound of alumina, separating the major portion of the mother liquor, drying the unwashed precipitate and immersing in water to cause granulation and washing.

3. The process of making purifying materials which comprises precipitating a solution containing silica and alkali by an alkaline solution of a compound of alumina, separating the major portion of the mother liquor, drying the unwashed precipitate and immersing in water to cause granulation and washing.

4. The process of making purifying materials which comprises precipitating a solution containing silica and alkali by a solution of a compound of a metal oxid, separating the major portion of the mother liquor, drying the unwashed precipitate to expel moisture and open the pores, exposing the dried material to the air for a time and immersing in water to cause granulation and washing.

5. The process of making purifying materials which comprises precipitating a solution containing silica and alkali by a solution of a compound of alumina, separating the major portion of the mother liquor, drying the unwashed precipitate to expel moisture and open the pores, exposing the dried material to the air for a time and immersing in water to cause granulation and washing.

6. The process of making purifying materials which comprises precipitating a solution containing silica and alkali by an alkaline solution of a compound of alumina, separating the major portion of the mother liquor, drying the unwashed precipitate to expel moisture and open the pores, exposing the dried material to the air for a time and immersing in water to cause granulation and washing.

7. The process of making purifying materials which comprises precipitating a solution of an alkaline silicate by a solution containing an amphoteric metal oxid, pressing the precipitate to remove the bulk of the mother liquor, drying at a low temperature the unwashed pressed precipitate containing the residue of the mother liquor, exposing to an atmosphere containing a certain amount of water vapor till a limited degree of rehydration takes place, plunging into water to disintegrate the mass and washing the granules so formed.

In testimony whereof, I affix my signature below.

G. RUDORF.